(12) United States Patent
Lee

(10) Patent No.: US 6,476,523 B1
(45) Date of Patent: Nov. 5, 2002

(54) ELECTRONIC CLOCK AND TIMED OUTLET STRIP

(76) Inventor: Kathleen L. Lee, P.O. Box 1104, Taylors, SC (US) 29687

( * ) Notice: Subject to any disclaimer, the term of this patent is extended or adjusted under 35 U.S.C. 154(b) by 0 days.

(21) Appl. No.: 09/527,770

(22) Filed: Mar. 17, 2000

(51) Int. Cl.⁷ .................................................. H02J 3/00
(52) U.S. Cl. ...................................... 307/141; 307/38
(58) Field of Search ......................... 307/38–41, 116, 307/139, 141

(56) References Cited

U.S. PATENT DOCUMENTS

| | | | |
|---|---|---|---|
| D217,251 S | | 4/1970 | Kahn ............................ D26/1 |
| 3,867,642 A | * | 2/1975 | Ajrlahi ......................... 307/141 |
| RE31,848 E | * | 3/1985 | Nilssen ........................ 307/140 |
| D285,435 S | | 9/1986 | Hoehne ........................ D13/30 |
| D288,177 S | | 2/1987 | Yang ............................ D10/40 |
| D288,298 S | | 2/1987 | Yang ............................ D10/40 |
| 4,867,701 A | | 9/1989 | Wiand ......................... 439/501 |
| D304,324 S | | 10/1989 | Lovett et al. ................. D13/30 |
| 5,278,771 A | * | 1/1994 | Nyenya ........................ 307/38 |
| D352,667 S | | 11/1994 | Chen ............................ D10/40 |
| 5,425,659 A | | 6/1995 | Banks .......................... 439/650 |
| 5,430,598 A | * | 7/1995 | Rodolfo et al. ............. 307/141 |
| D379,965 S | | 6/1997 | Parshad ....................... D13/142 |
| D391,177 S | | 2/1998 | Stekelenburg ............... D10/40 |
| 5,742,466 A | * | 4/1998 | Kram ........................... 361/118 |
| 5,879,184 A | * | 3/1999 | Lopez .......................... 307/141 |
| D420,602 S | * | 2/2000 | Lamar et al. ................. D10/40 |

FOREIGN PATENT DOCUMENTS

JP    06208822 A    *    7/1994    ..........    H01H/43/04

OTHER PUBLICATIONS

Gem Electrical Mfg. Co., Inc. of Hauppauge, NY and sold by CVS Pharmacy, no date provided.

* cited by examiner

Primary Examiner—Fritz Fleming
(74) Attorney, Agent, or Firm—Robert R. Reed

(57) ABSTRACT

The present invention provides a timed electrical outlet strip or timed power supply. An outlet bar unit has a plurality of plug opening sets or receptacles for receiving a plug-in portion of an electrical plug-in component. Power is uniquely supplied to the outlet bar through a controller unit. The control unit has its own control power component. The power supply is time controlled to provide a clearly displayed and easily set time period when the outlet bar is activated. A clock is set to display real-time and to provide a reference signal for setting the activation period of the outlet strip. Activation times can be accurately set to the nearest minute or less. Times are display in the conventional twelve hour increments and time set portions may include different colors for the morning (AM) hours compared with the afternoon (PM) hours. Overload protection and an on-off switch is also provided. A continuous power supply is provided by setting the activation period equal to zero.

3 Claims, 5 Drawing Sheets

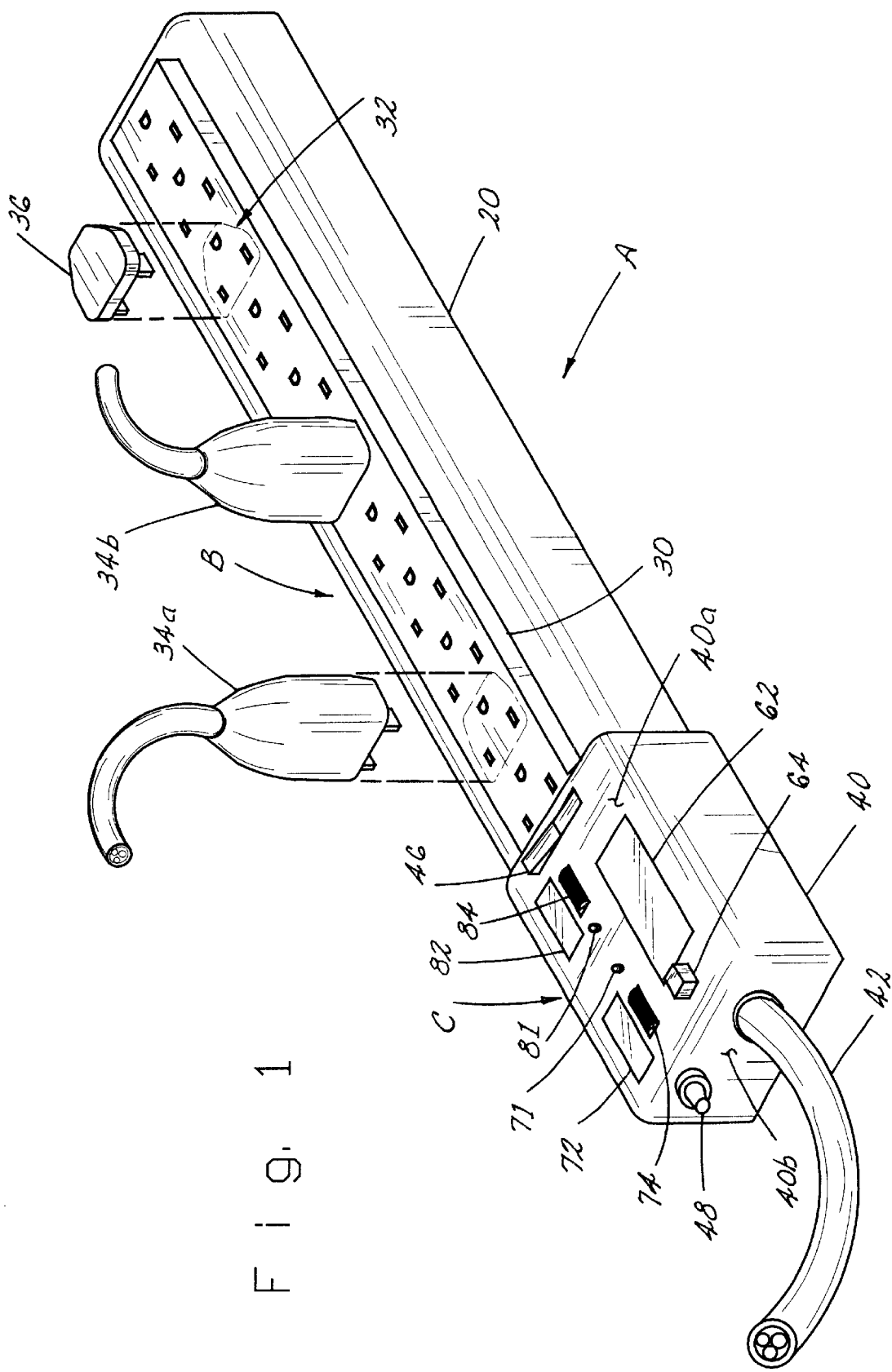

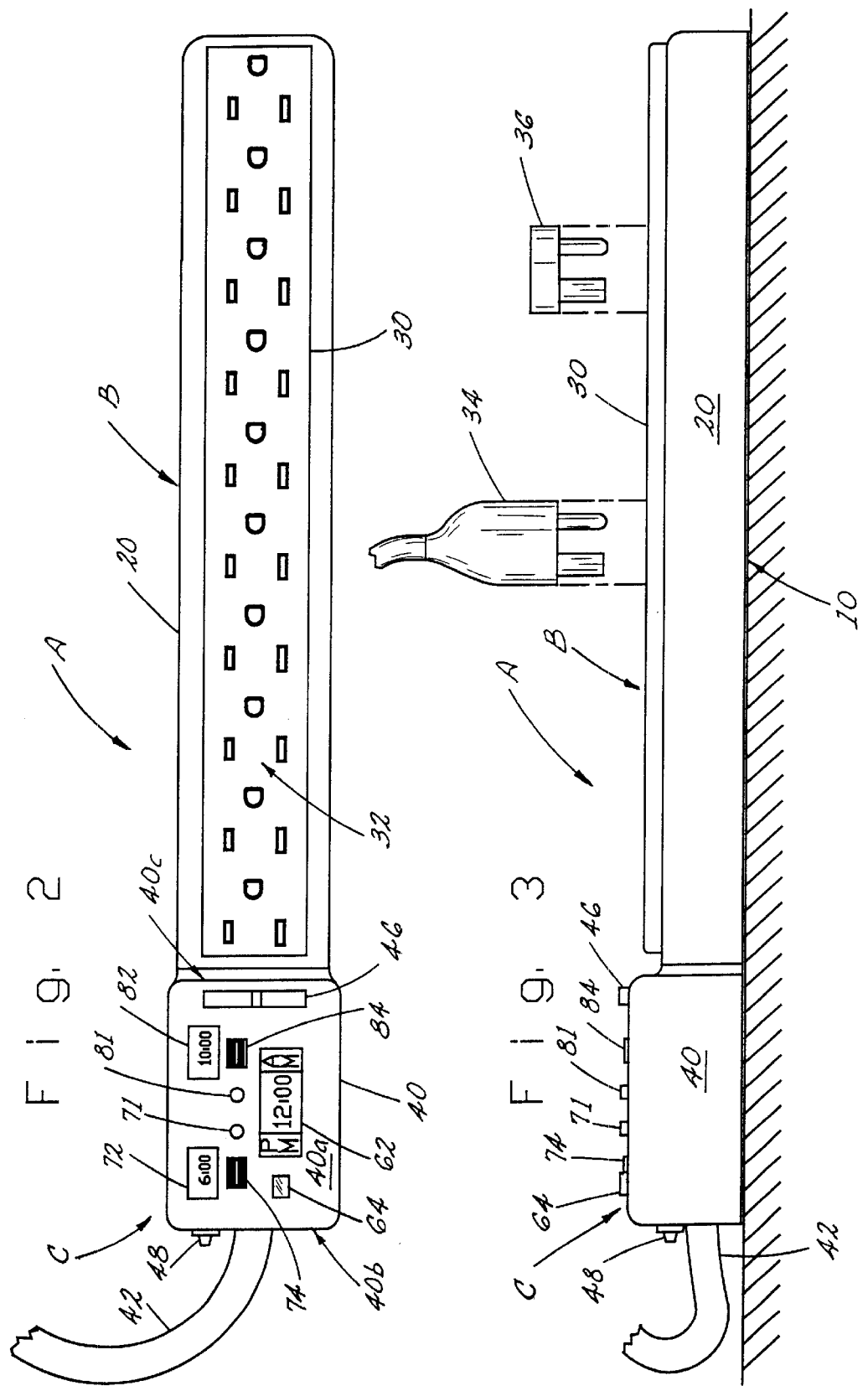

ELECTRONIC CLOCK AND TIMED OUTLET STRIP

BACKGROUND OF THE INVENTION

This invention is directed to providing a multiple outlet strip having an electronic clock and timer devices. In particular, the on and off times can be set to provide power to the multiple outlet strip over a predetermined time interval to be repeated each day.

Electrical outlet strips typically comprise a plurality of electrical outlet receptacles each having a plurality of openings therein to receive extension cords or other electrical components plugged into the outlet strip. Each electrical outlet receptacle receives a respective extension cord or other plug-in electronic component, such as a transformer. In general, each cord or device requires the same voltage and the openings of the strip receive the same standard-sized prong plug of each device. In most conventional outlet strips the receptacles are serially-arranged, such as those illustrated in U.S. Pat. Nos.: Des. 217,251; Des. 285,435; Des. 304,324; Des. 379,965; 4,867,701; and 5,425,659. The patent of U.S. Pat. No. 4,867,701 discloses an arrangements of openings for each receptacle and a circuit breaker which are both conventional in the industry. An alternative serially-arranged array of receptacles is illustrated in U.S. Pat. No. 5,425,659.

The need to turn on and off the power to electrical devices during the 24 hour day remains. This need has increased as a result of more electrical devices being used during specific times of the day. For example, the use of computers requires a number of devices having separate power cords to be turned on and off at the same time. In a further example, Christmas and other seasonal events require the use of a number of lighting devices with separate extension cords to be turned on at the same time and turned off at the same time. Preset timers assist the user of outlet devices in setting the time when the receptacles are activated. Conventional devices for setting the time are disclosed in U.S. Pat. Nos. Des. 288,177 and Des. 288,298. A timer dial is illustrated along with on and off tabs. The dials are numbered to 24 with 96 divisions around each dial; indicating settings in increments of 15 minutes. Receptacles are illustrated to be placed around a base unit having the timer dial. Lighting timers are common in the industry for installation between a power source and an outlet strip. A typical 24 hour lighting timer is manufactured by Gem Electrical Mfg. Co., Inc. of Hauppauge, N.Y. and sold by CVS Pharmacy. This time can be set to provide 4 On/Off settings per day with settings at increments of 30 minutes.

The use of multiple outlets which can be accurately set to come on at a precise time and off at another precise time represent a further need for certain electrical devices. This is particularly true for computing devices in the workplace. Electronic timers are disclosed in U.S. Pat. Nos. Des. 352,667 and Des. 391,177. These timers transfer power from a single power receptacle through the timer to another single receptacle. These patents do not disclose the nature of the timer or the type of information displayed. The need remains to provide a self-contained component to control the power supply by displaying the required information to accurately know the present time and to accurately set the on time as well as the off time for all receptacles of the outlet strip.

A further unfulfilled need is to provide a time references and displays which are most commonly used by the public. The times most common used are the twelve hours of the morning (AM) followed by twelve hours of the afternoon (PM). These are the times which normally appears on clocks and watches used by the public.

Accordingly, an object of the present invention is provide a timed electric outlet device for activating and controlling multiple receptacles of a power strip during an accurately set time interval.

Another object of the present invention is to accurately display the real-time of day as well as the on-time and the off-time during which electrical power is provided to multiple receptacles of a power strip or bar.

Still another object of the present invention is to provide a multiple outlet bar unit in combination with a clock where electrical power can be provided to multiple plug-in devices between an adjusted and displayed on-time and an adjusted and displayed off-time.

Yet another objective of the present invention is to display times in the morning AM and afternoon PM which are most commonly used by the public, and further to display a different color for the morning compared with the afternoon to further distinguish morning from afternoon.

SUMMARY OF THE INVENTION

The above objectives are accomplished according to the present invention by providing a timed electrical outlet strip or timed power supply. An outlet bar unit has a plurality of plug opening sets or receptacles for receiving a plug-in portion of an electrical plug-in component. Power is uniquely supplied to the outlet bar through a controller unit. The power supply is time controlled to provide a clearly displayed and easily set time period when the outlet bar is activated. A clock is set to display real-time and to provide a reference signal for setting the activation period of the outlet strip. Activation times can be accurately set to the nearest minute or less. Times are display in the conventional twelve hour increments and time set portions may include different colors for the morning (AM) hours compared with the afternoon (PM) hours. Overload protection and an on-off switch is also provided. A continuous power supply is provided by setting the activation period equal to zero.

In an embodiment of the invention a timed electrical outlet device provides a power supply for multiple plug-in components. The outlet device comprises an outlet bar unit having a plurality of plug opening sets to receive the plug-in components and connect the power supply to the components. A controller unit is connected between the outlet bar unit and a main power cable for establishing and controlling a time interval when the power supply is provided to the plug-in components. A time set portion of the controller unit includes a clock for establishing a real-time with a reference signal "T", an on-time device for establishing an on-time with a reference signal "To" when the power supply is to be turned on and an off-time device for establishing an off-time with a reference signal "Tf" when the power supply is to be turned off, wherein the real-time, the on-time and the off-time are digitally displayed on a display face of the controller unit to be observed and set by a user. The outlet device further includes a logic controller of the control unit for receiving the reference signals and determining an activation period when the real-time is greater than the on-time (T>To) and when the real-time is less than the off-time (T<Tf) so that the time interval is established.

The outlet unit of the invention further includes a control power component to provide a control voltage for the controller unit. The control power component includes the clock, the on-time device and the off-time device. Reference signals are established and times are set and displayed to the nearest one minute or less.

In another embodiment of the invention a timed power supply is provided for plug-in components having multiple outlet receptacles. The power supply is provided in combination with a real-time clock and includes an outlet bar unit having the receptacles in a serially-arranged array within an outlet housing. A controller housing has a display face and is affixed to one end of the outlet housing. A controller unit within the controller housing is electrically connected to the receptacles of the outlet bar. A clock set portion of the real-time clock is for setting real-time and establishing a real-time reference signal. An on-time device of the controller unit is interconnected with the clock for setting an on-time and supplying an on-time reference signal To. An off-time device of the controller unit is interconnected with the clock for setting an off-time and supplying an off-time reference signal Tf. A logic controller within the controller housing is for comparing real-time with the on-time and the off-time using the reference signals. A control switch of the logic controller is for establishing an activation period for the outlet receptacles between the on-time and the off-time. The controller unit further includes a plurality of displays in the display face of the controller housing for visually displaying the real-time of the clock along with the on-time and the off-time, wherein the activation period for the plug-in components is clearly observed by a user. The activation period can be set within a minute or less.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a perspective view of the clock-timed power outlet strip of the invention including multiple outlets with plug in devices, multiple time display windows, time set devices, a overload device and an on-off switch;

FIG. 2 is a top view of the clock-timed power outlet strip of FIG. 1 showing a clock time, an on time and an off time being displayed;

FIG. 3 is a side elevation view of the clock-timed power outlet strip of FIG. 1 showing the plug devices in a position to be plugged into respective outlets;

DESCRIPTION OF A PREFERRED EMBODIMENT

Figure 4:
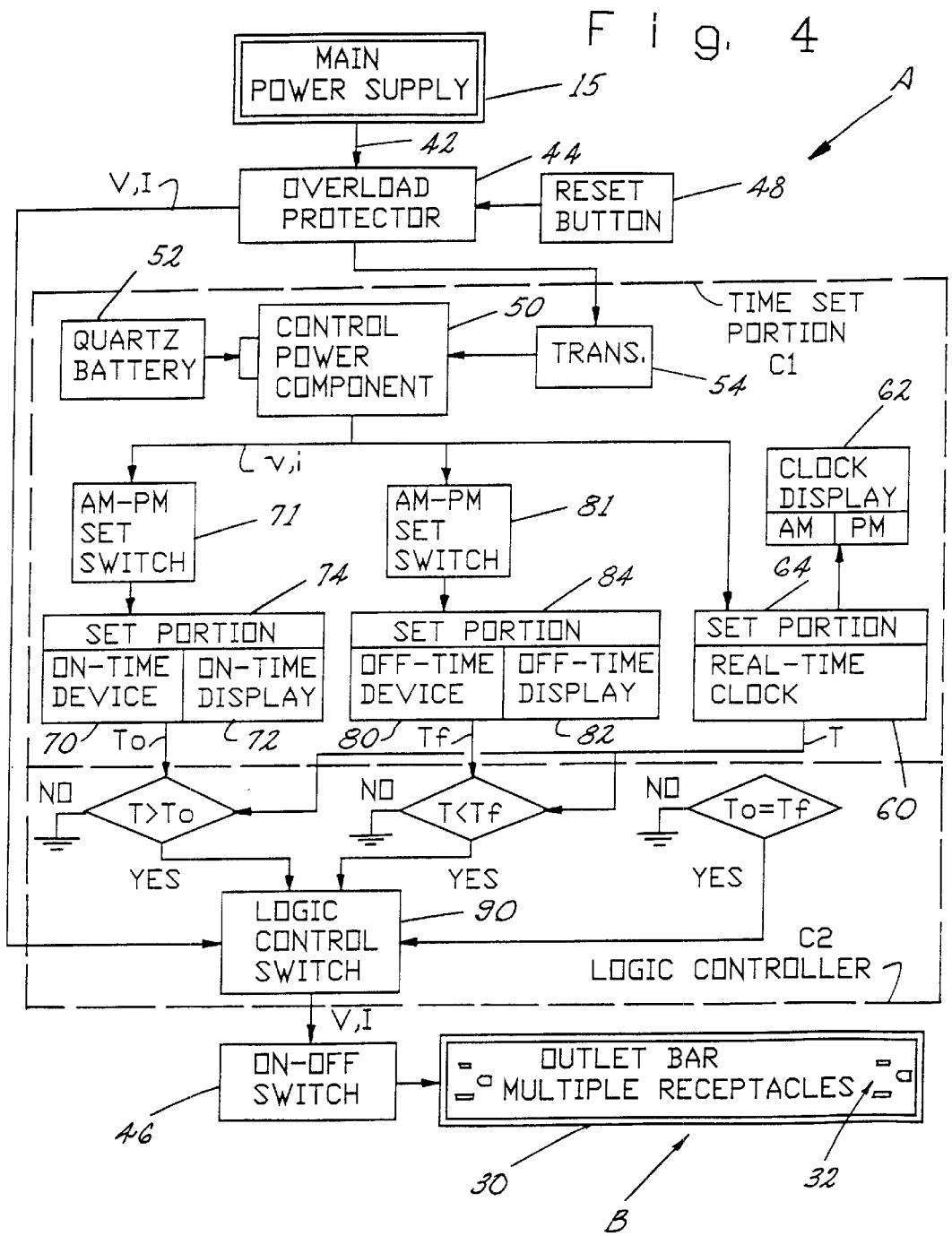
FIG. 4 is a flow diagram of the components and devices of the invention illustrating how they interconnect and operate electronically to provide the timed power supply of this invention.

Referring now in more detail to the drawings, the invention will now be described in more detail. The timed electrical outlet device of this invention includes an outlet strip with a controller unit attached at one end for controlling the power supplied to multiple receptacle opening sets. Each opening set can receive the plug of a plug-in component to supply power to the component, The controller unit uniquely includes time set portions and time displays so that a user can accurately set and visually observe real-time of a clock as well as an activation period when power is supplied to the outlet strip. The activation period is displayed as an on-time when the supply power is initiated and an off-time when the power supply is terminated until the on-time is again observed.

An embodiment of a timed electrical outlet device or timed power supply "A" is illustrated in the perspective view of FIG. 1. An outlet bar unit B comprises an outlet housing 20 supporting an outlet strip or bar unit 30. The outlet strip has a plurality of serially arranged plug opening sets 32. A pair of plug-in components in the form of extension cord plugs 34a and 34b are shown. In addition, a safety plug 36 is shown to illustrate the use of a non-active plug-in component for personal safety against electrical shock an for helping to make the outlet device usable for both indoor an all-weather outdoor purposes. Opening sets 32 can be alternately arranged and individually supported by outlet housing 20 within the scope of the invention.

A controller unit C includes a controller housing 40 attached to one end of the outlet housing. The controller unit receives a main power cord 42 providing a main power supply for the outlet strip, as illustrated in FIGS. 1, 2 and 3. The controller unit comprises the electrical components for providing a power supply for the plug-in components on a safe and timely basis. A display face 40a of the controller housing contains set portions and displays available to a user for setting and observing the power supply provided by the timed electrical outlet device A. This includes a digital clock display 62 of real-time, an on-time display 72 for observing an on-time when the power supply is to be turned on and an off-time display 82 for observing an off-time when the power supply is to be turned off. A clock set portion 64, shown in the form of a button, is provided for setting real time when electrical power is supplied to outlet device A through main power cable 42. An on-time set portion 74 is provided for setting the on-time and an off-time set portion 84 is provided for setting the off-time. The preferred on-time and off-time set devices are in the form of a roller which can be rotated in one direction to increase time and in the opposite direction to decrease time. The on-time and off-time set devices each further include an AM-PM set switch 71; 81 so that a respective display 72;82 can show times over a conventional 12 hour time interval. In addition, set switches 71 and 81 can be equipped so that displays 72 and 82 can have one color visibly displayed in the morning (AM) and another different color visibly displayed in the afternoon (PM). The unique 12 hour time intervals and different color displays provide the user with a time frame or reference times commonly used by the public, as illustrated in the plan view of FIG. 2.

Controller unit C further includes external access for the user to reset the timed power supply after an overload protector has interrupted the power supply. An overload problem occurs when the plug-in devices consume more power than a predetermined limiting value. Overload reset button 48 is depressed to return the power supply to the plug-in components when the overload problem has been resolved. In addition, the controller unit includes a direct on-off switch 46, which is easily accessed by the user on display face 40a, to override any effort of the other controller unit components to provide the power supply to outlet switch 30.

A side view of timed electrical outlet device A of this invention is illustrated in FIG. 3. The outlet device provides a timed power supply which is commonly placed on a surface 10 so that plug-in components can plugged into outlet strip 30 supported by outlet housing 20 of the outlet bar unit B. The outlet housing is in contact with the surface which may be at any angle from the horizontal including a vertical surface. A extension cord plug 34 and a safety plug 36 are to be plugged into the outlet strip as shown by the dashed lines in FIG. 3. Controller housing 40 of controller unit C is attached to the outlet housing of the outlet bar unit and also rests on surface 10. Display face 40a is on an opposite side of the controller housing from the surface to provide easy access to various set portions 64, 71, 74, 81 and 84, for setting respective times within the controller unit. On-off switch 46 also accessed from the display face.

The various features of the timed electrical outlet device or timed power supply are unique and important to the proper operation and use of the present invention. The operational features of the timed electrical outlet device are illustrated in the diagram of FIG. 4. The flow diagram illustrates the structural components and devices of the invention and how they interconnect and operate electronically to provide the timed power supply of this invention. Basically, the timing devices, switches and controller devices are housed within the controller housing (illustrated in the bottom view of FIG. 6). A main power supply is provided to the outlet device through a main power cable 42 directly connected to an overload protector 44. If the supply voltage "V" and current "I" result in excessive power to be supplied to the outlet device resulting in an unsafe operation, the overload protector will interrupt the power supply to the outlet device. The overload protector provides for protection against excessive power consumed by the plug-in components. When the overload is corrected, reset button 48 restores the power supply to outlet device A. Additional power interrupt for outlet strip 30 is provided by an on-off switch 46 placed in the electrical circuitry directly before the voltage and current flows into outlet strip 30. The user operates the on-off switch to prohibit the power supply from reaching the outlet strip. The voltage and power rating of the timed electrical outlet device can be selected to be consistent with the intended use of the device and the code requirements established by Underwriters Laboratories (UL) of Columbia, S.C. for listed appliances. The commonly used main power supply voltage for conventional plug-in components is 120 volts AC.

As previously disclosed, the controller unit provide for a timed power supply when the power strip of the outlet device is activated between an on-time and an off-time. The electrical components of a time set portion C1 of controller unit C defined by dashed lines in FIG. 4. The time set portion is energized by a control power component 50 which is powered by either a battery 52 or a transformer 54. The battery provides for independent operation of the time set portion of the controller unit without a main power supply. Therefore, the clock and other devices will operate continuously. The transformer uses the main power supply to power the control power component, which requires the main power cable to be plugged into the main power supply. The control power component supplies a control voltage "v" and control current "i" for the time set portion of the controller unit.

Figure 6:
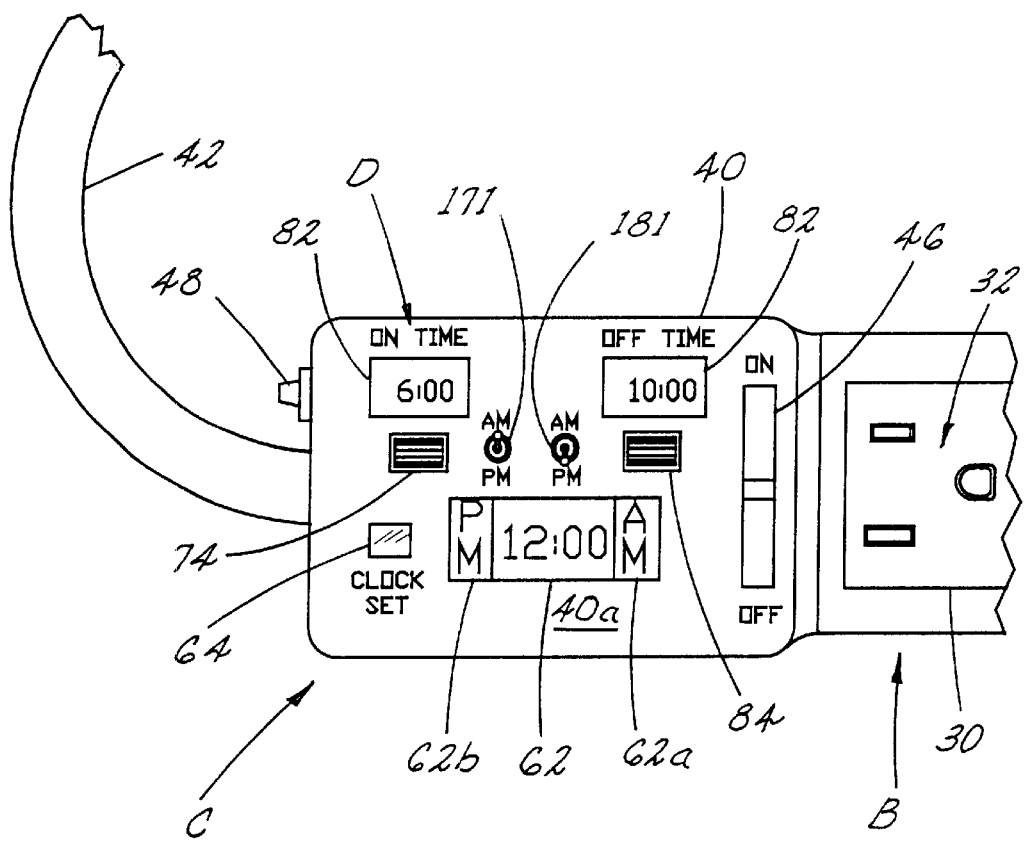
FIG. 6 is an enlarged top view of the display face of the controller unit illustrating the real-time, on-time and off-time being displayed, as well as indicia on the display face to assist the user in operating the timed electrical outlet device.

Having a control voltage and current, the various timing devices can be set to their respective times. The clock is set by a set portion 64 to a real-time represented by a reference signal "T" in FIG. 4. This step may not be necessary if the clock is running from a battery and has been previously set; as the real-time should already be set with the clock and displayed by a clock display 62. The clock display preferably has real-time digitally displayed within a twelve hour interval as commonly used by the public (FIGS. 2 and 6). The clock display may also have a morning "AM" display portion and an afternoon "PM" display portion for clearly indicating which twelve hour period is being displayed. In addition the clock real-time display portions may include an illumination element for illuminating morning hours in one color and afternoon hours in another different color.

The time at which the outlet strip is to have power turned on, called the on-time, is determined by the user and controlled by an on-time device 70. An AM-PM set switch 71 along with an on-time set portion 74 is used to establish the on-time represented by an on-time signal "To" in FIG. 4. Preferably, the on-time set portion has a roller device which can be rotated in one direction to increase time and in the opposite direction to decrease time. Once again, on-time is displayed in the normal twelve time intervals commonly used by the public. Preferably the on-time display is a digital display (FIGS. 2 and 6). In addition the on-time set portion and display may include an illumination element for illuminating morning hours in one color and afternoon hours in another different color.

The time at which the outlet strip is to have power turned off, called the off-time, is determined by the user and controlled by an off-time device 80. An AM-PM set switch 81 along with an on-time set portion 84 is used to establish the off-time represented by a off-time signal "Tf" in FIG. 4. Preferably, the off-time set portion has a roller device which can be rotated in one direction to increase time and in the opposite direction to decrease time. Once again, off-time is displayed in the normal twelve time intervals commonly used by the public. Preferably the off-time display is a digital display (FIGS. 2 and 6). In addition the off-time set portion and display may include an illumination element for illuminating morning hours in one color and afternoon hours in another different color.

Having set the on-time and the off-time for the timed electrical outlet device the activation time is defined as the interval of time between the on-time and the off-time. All receptacles or plug opening sets of outlet bar unit B are to have a power supply from main power supply 15 during this interval. The activation time is realized by a logic controller C2 of the controller unit, as indicated by the dashed lines of FIG. 4. The logic controller is input by the real time reference signal T, the on-time reference signal To and the off-time reference signal Tf from the time set portion of the controller unit. These signals are compared with one another to determine if an activation time exists and the outlet bar unit is to be activated. Logic operation 92 compares real-time reference signal T with the on-time reference signal To. If T>To a "yes" signal is transmitted to a logic control switch 90. At the same real-time, logic operation 94 compares real-time reference signal T with the off-time reference signal Tf. If T<Tf another "yes" signal is transmitted to control switch 90. A combination of the previous two yes signals provides the logic control switch with enough information to allow the power supply, represented by voltage V and current I, to be transmitted to on-off switch 46 as illustrated in FIG. 4.

In an alternate operational mode of the controller unit, the need to supply a continuous power supply (V,I) to the outlet bar unit is addressed. With this mode of operation the outlet device can essentially be used in a conventional manner. This need is solved by setting the on-time, represented by reference signal To, and the off-time, represented by reference signal Tf, equal to one another, or To=Tf. That is, logic operation 96 essentially compares on-time with off-time to see if they are equal. If they are equal, a "yes" signal is transmitted to control switch 90 and the power supply, represented by voltage V and current I, is transmitted to on-off switch 46.

Figure 5:
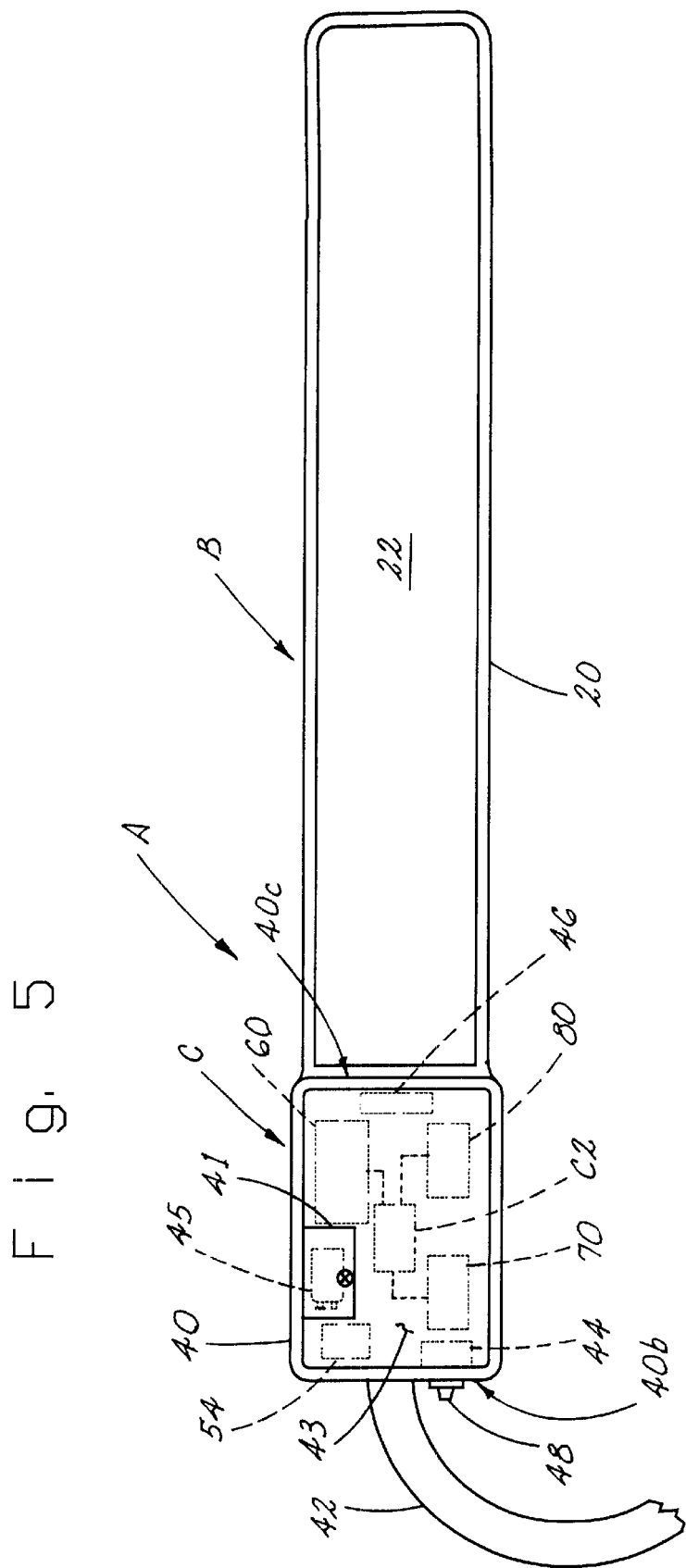
FIG. 5 is a rear view of the clock-timed power strip of FIG. 1 showing the battery access door and a location of electrical components and devices within the power strip.

Additional structural features of the timed electrical outlet device are illustrated in the bottom view of FIG. 5. Outlet housing 20 of outlet bar unit B has one end connected to a first side 40c of controller housing 40 of controller unit C. A single housing can be provided for both the bar unit and the controller unit within the scope of this invention. The preferred configuration uses separate housings so that an outlet bar unit with more or less than ten plug opening sets 32 (FIG. 2) can be used with the same controller unit. An outlet bottom cover 22 and a controller bottom cover 43 are provided to give easy access to the wiring and other components within timed electrical outlet unit A. However, each cover is attached to a respective housing so that safe operation of the outlet unit is provided. A battery access 41 is provided for replacing battery 45 when necessary for continued operation of the controller unit including the real-time clock device. Main power cable 42 enters a second side 40b, opposite the first side, of the controller housing. The main power cable is affixed to the controller housing so that the cable can not be pulled from the controller unit. Preferably, reset button 48 is also located at the second side of the controller housing.

A number of components of the controller unit are internally located within the controller housing and controller bottom cover for safety and durability of the timed power supply, as illustrated by dashed rectangles in FIG. 5. Transformer 54 and overload protector 44 are preferably internally located near the entrance of the power cable into the controller housing. Clock device 60, on-time device 70 and off-time device 80 are preferably internally located adjacent their respective displays 62, 72 and 82 of the controller housing (FIGS. 2 and 6). Logic controller C2, including logic control switch 90, is internally located in a central position within the controller housing to be easily connected to the clock device, the on-time device and the off-time device. On-off switch 46 is internally located near first face 40a of the controller housing to directly interrupt the power supply to outlet bar unit B. Alternate locations are possible for the components of the controller unit within the scope of this invention; consistent with combining the functions of certain components. For example, combining the functions of the on-time device and the off-time device with that of the logic controller may result in a single controller device and component.

Times are preferably displayed as digital numbers in clock display 62, on-time display 72 and off-time display 82. Common to the industry, numbers are displayed with a low energy device, such as a liquid crystal display (LCD) device. Additional features may be added in the form of indicia on display face 40a of controller housing 40 of controller unit C, as illustrated in FIG. 6. Indicia D on the display face is provided to assist the user in setting and operating the timed electrical outlet device. For example, words "on-time" and "off-time" can be used to indicate the respective displays which provide the observer with an indication of when the activation period starts and stops. In other illustrated examples, the real-time set portion 64 is identified by a "clock set" indicia and the on-off switch has the word "on" at one end and the word "off" at the other end. As discussed in the previous sections, times are displayed in the common used twelve hour increments. Therefore, the on-time set portion and the off-time set portion require a morning AM visual indicator and an afternoon PM visual indicator. The use of displays with different colors to provide visual indications has been discussed. An alternate means is illustrated in FIG. 6; where a toggle switch 171 is used for the on-time set portion and another toggle switch 181 is used for the off-time set portion. Morning "AM" and afternoon "PM" indicia are added adjacent each one of the toggle switches. Different colored numbers along with indicia is used in combination to clearly indicate and display real-time, on-time and off-time.

While a preferred embodiment of the invention has been described using specific terms, such description is for illustrative purposes only, and it is to be understood that changes and variations may be made without departing from the spirit or scope of the following claims.

What is claimed is:

1. An outlet bar unit in combination with a controller unit defining an outlet device for providing a timed power supply for all plug-in components connected to the outlet bar unit from a main power cable, said device comprising:

a plurality of serially arranged plug opening sets to receive the plug-in components and connect the power supply to the plug-in components;

a controller unit having a plurality of electrical components (of the controller unit) connected between the outlet bar unit and the main power cable for establishing and controlling daily 24 hour time intervals when the power supply is provided to all the plug opening sets;

a time set portion of said controller unit including a real-time 24 hour clock for establishing a real-time reference signal during a 24 hour time period, an on-time device including an on-time set portion for establishing an on-time signal when the power supply is to be turned on, and an off-time device including an off-time set portion for establishing an off-time signal when the power supply is to be turned off, wherein said real-time reference signal and said on-time and said off-time signals are digitally displayed on said display face of said controller unit to be manually set by a user;

a logic controller of said control unit for receiving said reference signals and establishing a daily activation period for all outlets defined by when said real-time is greater than said on-time and when said real-time is less than said off-time so that all the plug opening sets receive electrical power daily during said activation period;

said logic controller includes a logic control switch to receive the power supply and activate the outlet bar unit when said activation period exists; and said controller unit includes an on-off master switch located between said logic control switch and said outlet bar unit for said user to manually interrupt the power supply to said outlet bar unit at any time;

whereby electrical power is delivered to all said plug opening sets on a daily basis during said activation as long as said master switch is on.

2. The device of claim 1 wherein said logic controller has a constant activation period corresponding to a condition where said user sets on-time equal to off-time, wherein said logic control switch provides a uninterrupted power supply to said outlet bar unit.

3. The device of claim 1 including a current overload protector arranged between said power supply and said logic control for interrupting the power supply to said outlet bar unit when a total power being supplied to the plug-in components is greater than a predetermined value and a reset button for restoring the power supply when said total power is less than the predetermined value.

* * * * *